(12) United States Patent
Jain et al.

(10) Patent No.: US 7,793,139 B2
(45) Date of Patent: Sep. 7, 2010

(54) PARTIAL LINK-DOWN STATUS FOR VIRTUAL ETHERNET ADAPTERS

(75) Inventors: Vinit Jain, Austin, TX (US); Jorge Rafael Nogueras, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 11/609,641

(22) Filed: Dec. 12, 2006

(65) Prior Publication Data

US 2008/0140824 A1    Jun. 12, 2008

(51) Int. Cl.
G06F 11/00    (2006.01)
(52) U.S. Cl. .......................................................... 714/4
(58) Field of Classification Search .................. 714/48; 709/229; 370/216
See application file for complete search history.

(56) References Cited

U.S. PATENT DOCUMENTS

| | | | |
|---|---|---|---|
| 4,644,532 A | | 2/1987 | George et al. |
| 5,917,997 A * | | 6/1999 | Bell et al. ........................ 714/4 |
| 6,657,974 B1 * | | 12/2003 | Britton et al. ................ 370/255 |
| 6,675,206 B1 * | | 1/2004 | Britton et al. ................ 709/220 |
| 7,020,796 B1 * | | 3/2006 | Ennis et al. ..................... 714/4 |
| 7,260,518 B2 * | | 8/2007 | Kerr et al. ..................... 703/27 |
| 7,389,398 B2 * | | 6/2008 | Garney ........................ 711/173 |
| 7,570,603 B2 * | | 8/2009 | Fan et al. ..................... 370/254 |
| 2002/0156919 A1 * | | 10/2002 | Maeno ......................... 709/238 |
| 2003/0018927 A1 * | | 1/2003 | Gadir et al. ..................... 714/4 |
| 2008/0301692 A1 * | | 12/2008 | Billau et al. ................. 718/104 |

OTHER PUBLICATIONS

U.S. Appl. No. 11/397,845, filed Apr. 4, 2006, Jain et al.

* cited by examiner

Primary Examiner—Robert Beausoliel
Assistant Examiner—Amine Riad
(74) Attorney, Agent, or Firm—Yee & Associates, P.C.; Matthew W. Baca

(57) ABSTRACT

A computer-implemented method, an apparatus, and a computer-usable program product for identifying a link status for a virtual adapter in a logical partition framework are provided. A partition management firmware receives a signal identifying a communication disruption in a link associated with the virtual adapter within the logical partition framework. The partition management firmware identifies which links associated with the virtual adapter are affected by the communication disruption. Responsive to identifying that only a physical link associated with the virtual adapter is disrupted, the partition management firmware categorizes the link status for the virtual adapter as partial link-down. Responsive to identifying that both the physical link and a virtual link associated with the virtual adapter are disrupted, the partition management firmware categorizes the link status for the virtual adapter as link-down.

20 Claims, 5 Drawing Sheets

PARTIAL LINK-DOWN STATUS FOR VIRTUAL ETHERNET ADAPTERS

BACKGROUND OF THE INVENTION

1. Field of the Invention

The present invention relates generally to an improved data processing system. More specifically, the present invention relates to Ethernet adapters. Still yet more specifically, the present invention is a computer-implemented method, an apparatus, and a computer program product for identifying a link status for a virtual adapter in a logical partition framework.

2. Description of the Related Art

Increasingly, large symmetric multi-processor data processing systems are no longer being used as single large data processing systems. Instead, these types of data processing systems are being partitioned and used as smaller systems. These systems are also referred to as logical partitioned (LPAR) data processing systems. Logical partitions within a data processing system allow multiple copies of a single operating system or multiple heterogeneous operating systems to be simultaneously run on a single data processing system platform. A partition, within which an operating system image runs, is assigned a non-overlapping subset of the platform's resources. These platform allocable resources include one or more architecturally distinct processors and their interrupt management area, regions of system memory, and input/output (I/O) adapter bus slots. The partition's resources are represented by the platform's firmware to the operating system image.

Each distinct operation system or image of an operating system running within a platform is protected from each other such that software errors on one logical partition cannot affect the correct operations of any of the other partitions. This protection is provided by allocating a disjointed set of platform resources to be directly managed by each operating system image and by providing mechanisms for insuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocable resources within the platform.

With respect to hardware resources in a logical partitioned data processing system, these resources are disjointly shared among various partitions. These resources may include, for example, input/output (I/O) adapters, memory DIMMs, non-volatile random access memory (NVRAM), and hard disk drives. Each partition within a LPAR data processing system may be booted and shut down over and over without having to power-cycle the entire data processing system.

Each logical partition can communicate with other partitions within the same framework using a virtual Ethernet adapter. A virtual Ethernet adapter is a software component which performs the same functions as a physical Ethernet adapter. A virtual Ethernet adapter facilitates communications between partitions, while a physical Ethernet adapter facilitates communications between an external data processing system and the logical partition framework.

A virtual Ethernet adapter is not subject to the same communications failures as a physical Ethernet adapter. For example, communications in a physical Ethernet adapter can fail due to hardware issues, faulty switches, or an unplugged Ethernet cable. Additionally, even if a logical partition framework experiences a failure in the physical Ethernet adapter, communications between logical partitions can continue without interruption.

However, currently, the failure identification system only includes a general link-up or link-down status. The link-up status indicates that no communications failures currently exist in the framework. The link-down status indicates a general interruption in communications with no identification of whether the failure exists with a physical or virtual Ethernet adapter.

Therefore, at times, the link-down status is a misnomer because, in certain situations, only the physical Ethernet adapter, and not the virtual Ethernet adapter, is down. Thus, communications are only interrupted within the external data processing system and not within the logical partition framework itself.

SUMMARY OF THE INVENTION

The illustrative embodiments provide a computer-implemented method, an apparatus, and a computer-usable program product for identifying a link status for a virtual adapter in a logical partition framework. A partition management firmware receives a signal identifying a communication disruption in a link associated with the virtual adapter within the logical partition framework. The partition management firmware identifies which links associated with the virtual adapter are affected by the communication disruption. Responsive to identifying that only a physical link associated with the virtual adapter is disrupted, the partition management firmware categorizes the link status for the virtual adapter as partial link-down. Responsive to identifying that both the physical link and a virtual link associated with the virtual adapter are disrupted, the partition management firmware categorizes the link status for the virtual adapter as link-down.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
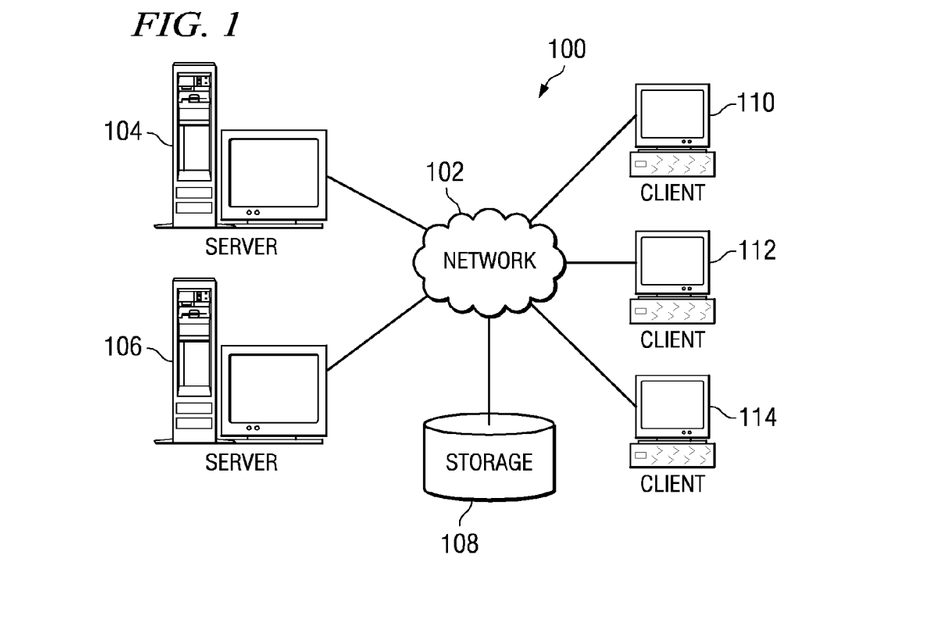
FIG. 1 depicts a network of data processing systems in which illustrative embodiments may be implemented.
Figure 2:
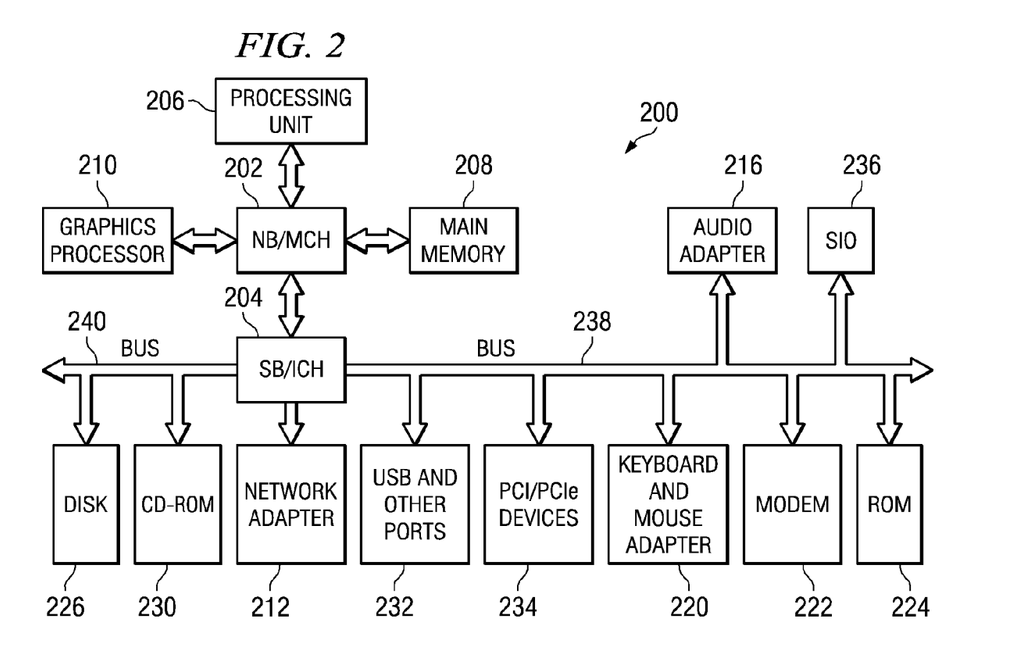
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications, to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, and universal serial bus (USB) other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204 through bus 238.

An operating system runs on processing unit 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object-oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer-implemented instructions, which may be located in a memory such as, for example, main memory 208, read only memory 224, or one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and the above-described examples are not meant to imply architectural limitations. For example, data processing system 200 also may be a tablet computer, a laptop computer, or a telephone device in addition to taking the form of a PDA.

Figure 3:
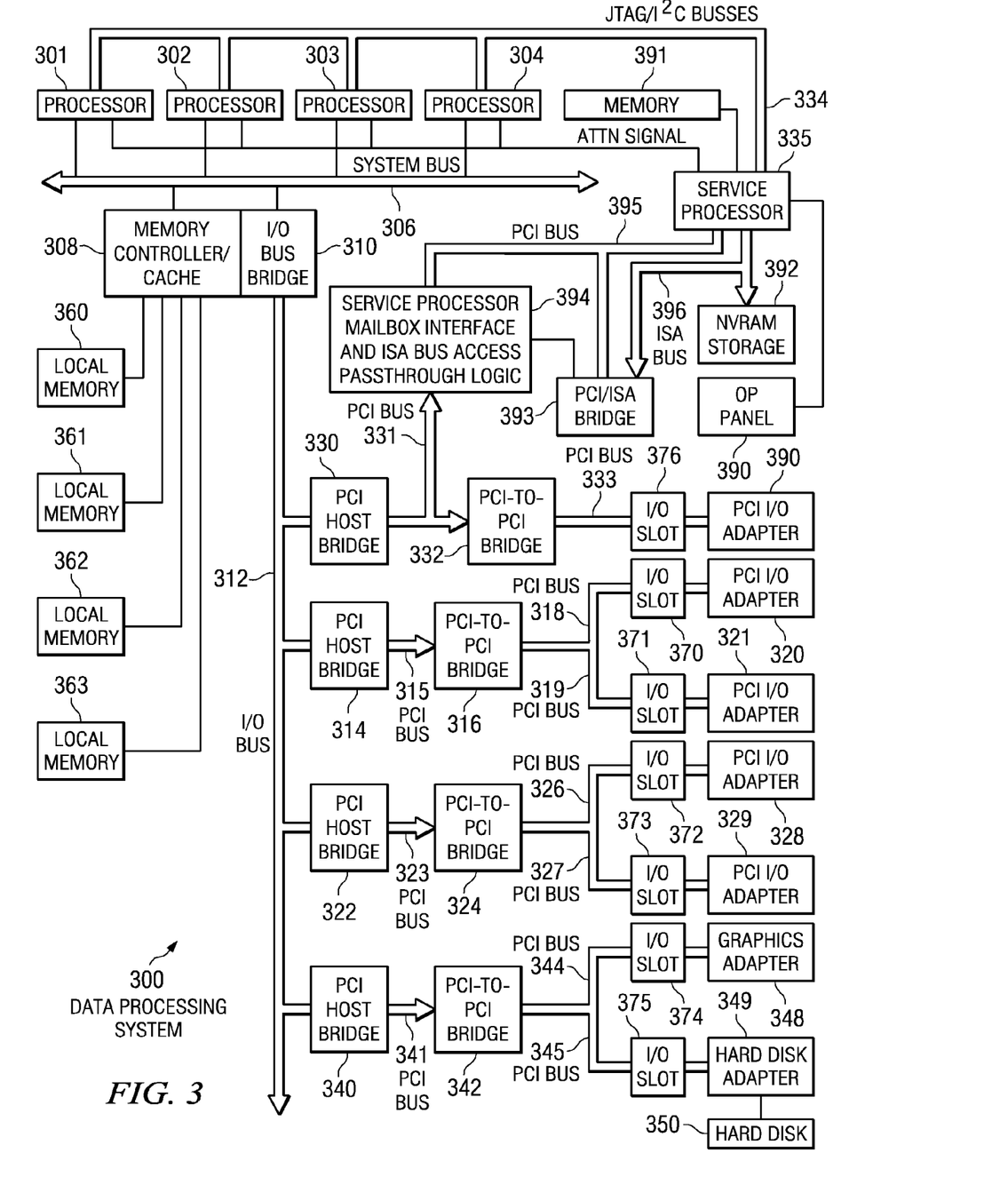
FIG. 3 is a block diagram of a data processing system in which illustrative embodiments may be implemented.

With reference now to the figures, and in particular with reference to FIG. 3, a block diagram of a data processing system in which illustrative embodiments may be implemented is depicted. Data processing system 300 can be implemented as servers 104 and 106 of FIG. 1 or as data processing system 200 of FIG. 2. Data processing system 300 may be a symmetric multiprocessor (SMP) system including a plurality of processors 301, 302, 303, and 304, which connect to system bus 306. For example, data processing system 300 may be an IBM® eServer®, a product of International Business Machines Corporation in Armonk, N.Y., implemented as a server within a network. Alternatively, a single processor system may be employed. Also connected to system bus 306 is memory controller/cache 308, which provides an interface to a plurality of local memories 360-363. I/O bus bridge 310 connects to system bus 306 and provides an interface to I/O bus 312. Memory controller/cache 308 and I/O bus bridge 310 may be integrated as depicted.

Data processing system 300 is a logical partitioned (LPAR) data processing system. Thus, data processing system 300 may have multiple heterogeneous operating systems (or multiple instances of a single operating system) running simultaneously. Each of these multiple operating systems may have any number of software programs executing within it. Data processing system 300 is logically partitioned such that different PCI I/O adapters 320-321, 328-329, and 336, graphics adapter 348, and hard disk adapter 349 may be assigned to different logical partitions. In this case, graphics adapter 348 connects for a display device (not shown), while hard disk adapter 349 connects to and controls hard disk 350.

Thus, for example, suppose data processing system 300 is divided into three logical partitions, P1, P2, and P3. Each of PCI I/O adapters 320-321, 328-329, 336, graphics adapter 348, hard disk adapter 349, each of host processors 301-304, and memory from local memories 360-363 is assigned to each of the three partitions. In these examples, memories 360-363 may take the form of dual in-line memory modules (DIMMs). DIMMs are not normally assigned on a per DIMM basis to partitions. Instead, a partition will get a portion of the overall memory seen by the platform. For example, processor 301, some portion of memory from local memories 360-363, and I/O adapters 320, 328, and 329 may be assigned to logical partition PI; processors 302-303, some portion of memory from local memories 360-363, and PCI I/O adapters 321 and 336 may be assigned to partition P2; and processor 304, some portion of memory from local memories 360-363, graphics adapter 348 and hard disk adapter 349 may be assigned to logical partition P3.

Each operating system executing within data processing system 300 is assigned to a different logical partition. Thus, each operating system executing within data processing system 300 may access only those I/O units that are within its logical partition. Thus, for example, one instance of the Advanced Interactive Executive (AIX®) operating system may be executing within partition P1, a second instance (image) of the AIX® operating system may be executing within partition P2, and a Linux® or OS/400® operating system may be operating within logical partition P3. AIX® and OS/400® are registered trademarks of International Business Machines Corporation in the United States, other countries, or both. Linux® is a registered trademark of Linus Torvalds in the United States, other countries, or both.

Peripheral Component Interconnect (PCI) host bridge 314 connected to I/O bus 312 provides an interface to PCI bus 315. A number of PCI input/output (I/O) adapters 320-321 connect to PCI bus 315 through PCI-to-PCI bridge 316, PCI bus 318, PCI bus 319, I/O slot 370, and I/O slot 371. PCI-to-PCI bridge 316 provides an interface to PCI bus 318 and PCI bus 319. PCI I/O adapters 320 and 321 are placed into I/O slots 370 and 371, respectively. Typical PCI bus implementations support between four and eight I/O adapters, i.e., expansion slots for add-in connectors. Each PCI I/O adapter 320-321 provides an interface between data processing system 300 and input/output devices such as, for example, other network computers, which are clients to data processing system 300.

An additional PCI host bridge 322 provides an interface for an additional PCI bus 323. PCI bus 323 connects to a plurality of PCI I/O adapters 328-329. PCI I/O adapters 328-329 connect to PCI bus 323 through PCI-to-PCI bridge 324, PCI bus 326, PCI bus 327, I/O slot 372, and I/O slot 373. PCI-to-PCI bridge 324 provides an interface to PCI bus 326 and PCI bus 327. PCI I/O adapters 328 and 329 are placed into I/O slots 372 and 373, respectively. In this manner, additional I/O devices, such as, for example, modems or network adapters may be supported through each of PCI I/O adapters 328-329. Consequently, data processing system 300 allows connections to multiple network computers.

A memory mapped graphics adapter 348 is inserted into I/O slot 374 and connects to I/O bus 312 through PCI bus 344, PCI-to-PCI bridge 342, PCI bus 341, and PCI host bridge 340. Hard disk adapter 349 may be placed into I/O slot 375, which connects to PCI bus 345. In turn, PCI bus 345 connects to PCI-to-PCI bridge 342, which connects to PCI host bridge 340 by PCI bus 341.

A PCI host bridge 330 provides an interface for a PCI bus 331 to connect to I/O bus 312. PCI I/O adapter 336 connects to I/O slot 376, which connects to PCI-to-PCI bridge 332 by PCI bus 333. PCI-to-PCI bridge 332 connects to PCI bus 331. PCI bus 331 also connects PCI host bridge 330 to the service processor mailbox interface and ISA bus access pass through logic 394 and PCI-to-PCI bridge 332. Service processor mailbox interface and ISA bus access pass through logic 394 forwards PCI accesses destined to the PCI/ISA bridge 393. NVRAM storage 392 connects to the ISA bus 396. Service processor 335 connects to service processor mailbox interface and ISA bus access pass through logic 394 through its local PCI bus 395. Service processor 335 also connects to processors 301-304 via a plurality of JTAG/I$^2$C busses 334. JTAG/I$^2$C busses 334 are a combination of JTAG/scan busses (see IEEE 1149.1) and Phillips I$^2$C busses. However, alternatively, JTAG/I$^2$C busses 334 may be replaced by only Phillips I$^2$C busses or only JTAG/scan busses. All ATTN signals of the host processors 301, 302, 303, and 304 connect together to an interrupt input signal of service processor 335. Service processor 335 has its own local memory 391 and has access to the hardware OP-panel 390.

When data processing system 300 is initially powered up, service processor 335 uses the JTAG/I$^2$C busses 334 to interrogate the system (host) processors 301-304, memory controller/cache 308, and I/O bus bridge 310. At the completion of this step, service processor 335 has an inventory and topology understanding of data processing system 300. Service processor 335 also executes Built-In-Self-Tests (BISTs), Basic Assurance Tests (BATs), and memory tests on all elements found by interrogating the host processors 301-304, memory controller/cache 308, and I/O bus bridge 310. Any error information for failures detected during the BISTs, BATs, and memory tests are gathered and reported by service processor 335.

If a meaningful or valid configuration of system resources is still possible after taking out the elements found to be faulty during the BISTs, BATs, and memory tests, then data processing system 300 is allowed to proceed to load executable code into local (host) memories 360-363. Service processor 335 then releases host processors 301-304 for execution of the code loaded into local memory 360-363. While host processors 301-304 are executing code from respective operating systems within data processing system 300, service processor 335 enters a mode of monitoring and reporting errors. The type of items monitored by service processor 335 includes, for example, the cooling fan speed and operation, thermal sensors, power supply regulators, and recoverable and non-recoverable errors reported by processors 301-304, local memories 360-363, and I/O bus bridge 310.

Service processor 335 saves and reports error information related to all the monitored items in data processing system 300. Service processor 335 also takes action based on the type of errors and defined thresholds. For example, service processor 335 may take note of excessive recoverable errors on a processor's cache memory and decide that this is predictive of a hard failure. Based on this determination, service processor 335 may mark that resource for deconfiguration during the current running session and future Initial Program Loads (IPLs). IPLs are also sometimes referred to as a "boot" or "bootstrap".

Data processing system 300 may be implemented using various commercially available computer systems. For example, data processing system 300 may be implemented using IBM® eServer™ iSeries™ Model 840 system available from International Business Machines Corporation. IBM® eServer™ and iSeries™ are registered trademarks of International Business Machines Corporation in the United States, other countries, or both. Such a system may support logical partitioning using an OS/400 operating system, which is also available from International Business Machines Corporation.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to illustrative embodiments.

Figure 4:
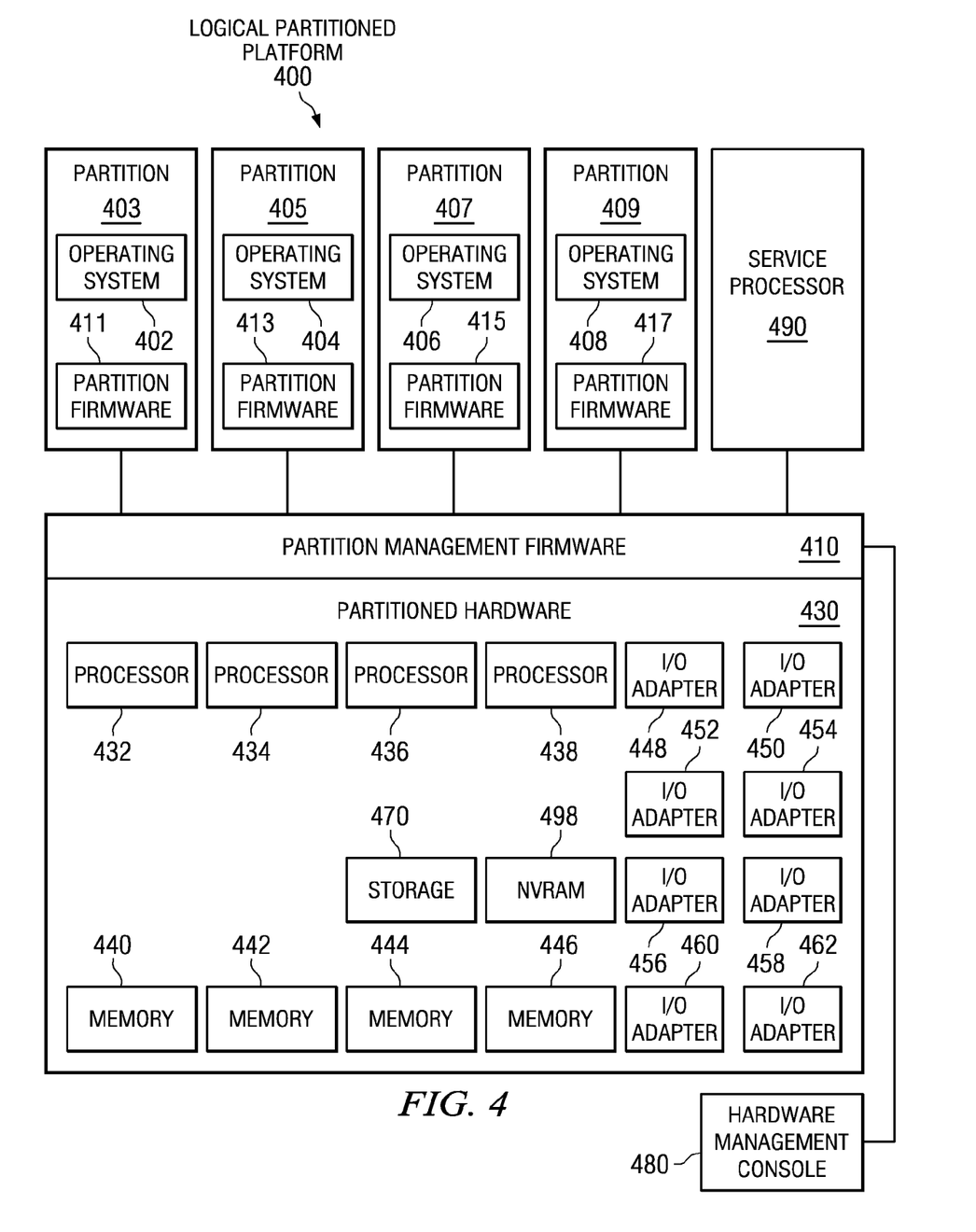
FIG. 4 is a block diagram of an exemplary logical partitioned platform in which illustrative embodiments may be implemented.

With reference now to FIG. 4, a block diagram of an exemplary logical partitioned platform is depicted in which illustrative embodiments may be implemented. The hardware in logical partitioned platform 400 may be implemented as, for example, data processing system 300 in FIG. 3. Logical partitioned platform 400 includes partitioned hardware 430, operating systems 402, 404, 406, 408, and partition management firmware 410. Operating systems 402, 404, 406, and 408 may be multiple copies of a single operating system or multiple heterogeneous operating systems simultaneously run on logical partitioned platform 400. These operating systems may be implemented using OS/400®, which is designed to interface with a partition management firmware, such as Hypervisor, which is available from International Business Machines Corporation. OS/400® is used only as an example in these illustrative embodiments. Of course, other types of operating systems, such as AIX® and Linux®, may be used depending on the particular implementation. Operating systems 402, 404, 406, and 408 are located in partitions 403, 405, 407, and 409, respectively. Hypervisor software is an example of software that may be used to implement partition management firmware 410 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (nonvolatile RAM).

Additionally, these partitions also include partition firmware 411, 413, 415, and 417. Partition firmware 411, 413, 415, and 417 may be implemented using initial bootstrap code, IEEE-1275 Standard Open Firmware, and RunTime Abstraction Software (RTAS), which is available from International Business Machines Corporation. When partitions 403, 405, 407, and 409 are instantiated, a copy of bootstrap code is loaded onto partitions 403, 405, 407, and 409 by partition management firmware 410. Thereafter, control is transferred to the bootstrap code with the bootstrap code then loading OpenFirmware and RTAS. The processors associated or assigned to the partitions are then dispatched to the partition's memory to execute the partition firmware.

Partitioned hardware 430 includes a plurality of processors 432-438, a plurality of system memory units 440-446, a plurality of input/output (I/O) adapters 448-462, and a storage unit 470. Each of the processors 432-438, memory units 440-446, NVRAM storage 498, and I/O adapters 448-462 may be assigned to one of multiple partitions within logical partitioned platform 400, each of which corresponds to one of operating systems 402, 404, 406, and 408.

Partition management firmware 410 performs a number of functions and services for partitions 403, 405, 407, and 409 to create and enforce the partitioning of logical partitioned platform 400. Partition management firmware 410 is a firmware implemented virtual machine identical to the underlying hardware. Thus, partition management firmware 410 allows the simultaneous execution of independent OS images 402, 404, 406, and 408 by virtualizing all the hardware resources of logical partitioned platform 400.

Service processor 490 may be used to provide various services, such as processing of platform errors in the partitions. These services may also act as a service agent to report errors back to a vendor, such as International Business Machines Corporation. Operations of the different partitions may be controlled through a Hardware Management Console (HMC), such as hardware management console 480. Hardware management console 480 is a separate data processing system from which a system administrator may perform various functions including reallocation of resources to different partitions.

The illustrative embodiments provide a computer-implemented method, an apparatus, and a computer-usable program product for identifying a link status for a virtual adapter in a logical partition framework. A partition management firmware receives a signal identifying a communication disruption in a link associated with the virtual adapter within the logical partition framework. The partition management firmware identifies which links associated with the virtual adapter are affected by the communication disruption. Two types of links can be disrupted in a logical partition framework: a physical link and a virtual link. The physical link facilitates communications between the logical partition framework and an external network. The physical link is an actual physical device, such as an Ethernet adapter. The virtual link facilitates communications between each logical partition in the logical partition framework. The virtual link is a software component or a set of software instructions that performs the same function as a physical Ethernet adapter.

In response to identifying that only a physical link associated with the virtual adapter is disrupted, the partition management firmware categorizes the link status for the virtual adapter as partial link-down. In response to identifying that both the physical link and a virtual link associated with the virtual adapter are disrupted, the partition management firmware categorizes the link status for the virtual adapter as link-down. Absent the receipt of a signal, the partition management firmware categorizes the link status for the virtual adapter as link-up.

In response to the link status being partial link-down, the partition management firmware notifies an operating system that the physical link associated with the virtual adapter has a link status of link down. In response to receiving the notification, the operating system initiates instructions to identify an alternative route for the logical partition framework to communicate with an external network. In one embodiment, the alternative route is to identify another physical link to communicate with an external network. In another embodiment, the alternative route is initiating an internet address takeover procedure. Additionally, in a partial link-down status, communications between each logical partition in the logical partition framework continues.

Figure 5:
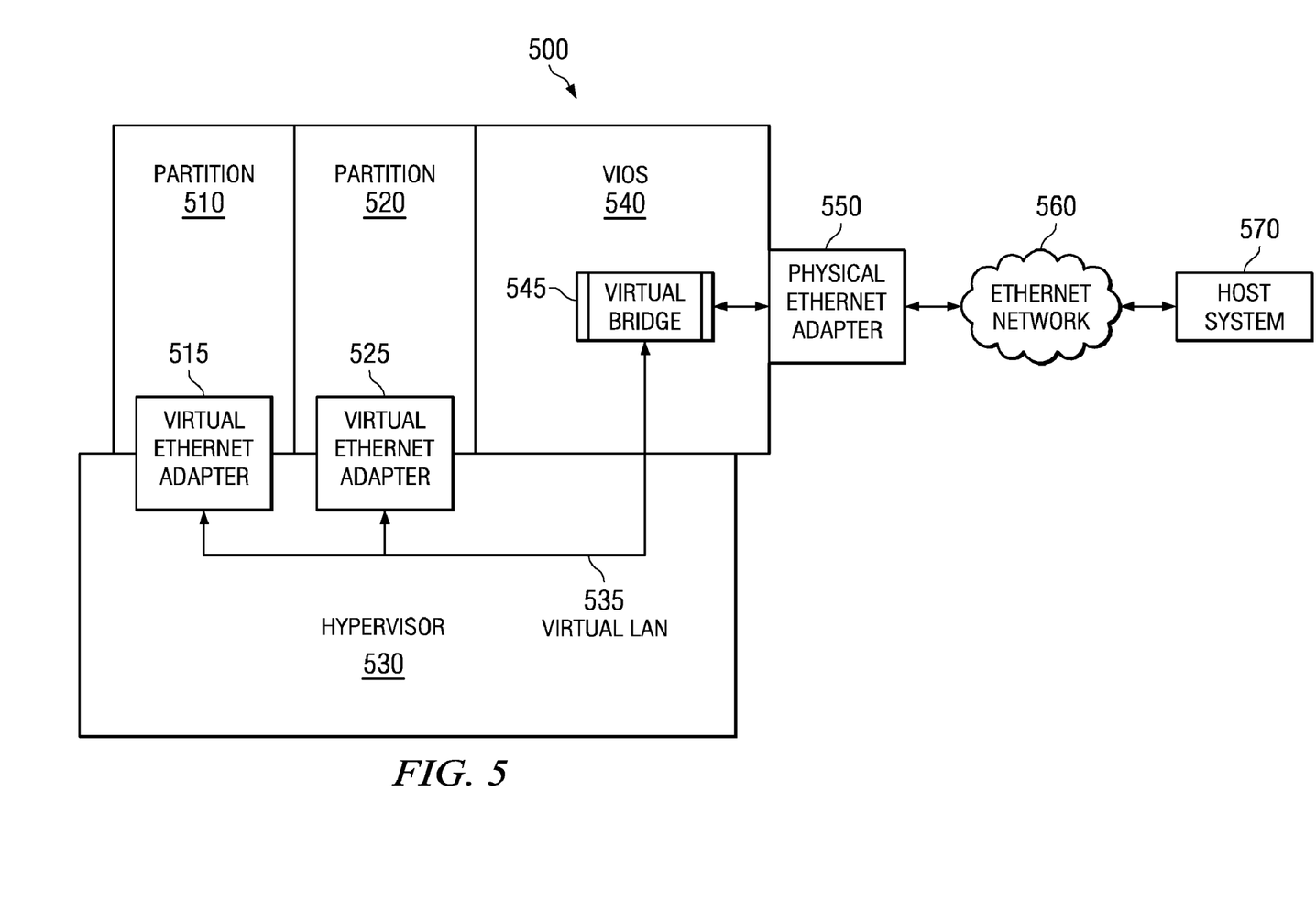
FIG. 5 illustrates a logical partition framework, in accordance with an illustrative embodiment.

FIG. 5 illustrates a logical partition framework, in accordance with an illustrative embodiment. Logical partition platform 500 can be executed as logical partition platform 400 of FIG. 4. Logical partition platform 500 includes partitions 510 and 520, hypervisor 530, Virtual Input/Output Server (VIOS) 540, physical Ethernet adapter 550, Ethernet network 560, and host system 570. In the illustrative embodiment, the components of logical partition platform 500 are both software and hardware embodiments.

Logical partitions 510 and 520 are similar to partitions 403, 404, 407, and 409 of FIG. 4. In the illustrative embodiment, partition 510 uses AIX® for an operating system, while partition 520 uses Linux® for an operating system. The illustrative embodiment is not limited to the exemplified operating systems and can include any operating system without deviating from the scope of the illustrative embodiments.

Logical partition 510 includes virtual Ethernet adapter 515, and logical partition 520 includes virtual Ethernet adapter 525. An adapter is a device that connects two different components together. Thus, an Ethernet adapter is a device that connects computer networking devices together. In the illustrative embodiment, virtual Ethernet adapters 515 and 525 connect partition 510, partition 520, hypervisor 530, and VIOS 540 together. Virtual Ethernet adapters 515 and 525 are considered "virtual" because a physical device, such as a connector, does not exist. Instead, a software component or set of software instructions performs the same functions as the connector or a physical Ethernet adapter.

Virtual Ethernet adapters 515 and 525 facilitate communications between logical partitions 510 and 520 via virtual local area network (VLAN) 535. VLAN 535 is a virtual cable that transports data packets between two components. In the illustrative embodiment, VLAN 535 transmits data packets between logical partitions 510 and 520. VLAN 535 also transmits data packets between logical partitions 510 and 520 and VIOS 540.

VLAN 535 is executed within hypervisor 530. Hypervisor 530 can be executed as partition management firmware, such as partition management firmware 410 of FIG. 4. Hypervisor 530 allows for multiple operating systems to operate in a single data processing system. In the illustrative embodiment, hypervisor 530 allows for partitions 510 and 520 to operate using AIX® and Linux® operating systems, respectively.

VIOS 540 is a type of logical partition that allows the sharing of I/O devices, such as a networking or storage device, between different partitions. VIOS 540 includes virtual bridge 545. Virtual bridge 545 provides a mechanism for hypervisor 530 to identify the link status of physical Ethernet adapter 550. Virtual bridge 545 also facilitates communications between virtual Ethernet adapters 515 and 525 and physical Ethernet adapter 550 via hypervisor 530. Virtual Ethernet adapters 515 and 525 facilitate communications between internal logical partitions, such as logical partitions 510 and 520. Physical Ethernet adapter 550, on the other hand, facilitates communications between internal and external logical partitions. An internal logical partition is a logical partition within a single data processing system.

External logical partitions can be one or more data processing systems, such as clients 110, 112, and 114 of FIG. 1, which are external to the data processing system that includes logical partitions 510 and 520. Thus, in the illustrative embodiments, physical Ethernet adapter 550 facilitates communications between logical partitions 510 and 520 with host system 570 via Ethernet network 560.

Physical Ethernet adapter 550 can be any type of adapter, including but not limited to a Gigabit Ethernet Adapter or a 10/100 Mbps Ethernet Adapter. In the illustrative embodiment, physical Ethernet adapter 550 is a Gigabit Ethernet adapter.

In the illustrative embodiment, host system 570 is a computer and can be implemented as a data processing system, similar to clients 110, 112, and 114 of FIG. 1 or data processing system 200 of FIG. 2. In alternative embodiments, host system 570 can also be a personal digital assistant (PDA), a wireless phone, or any other data processing system.

Ethernet network 560 connects physical Ethernet adapter 550 to host system 570. In the illustrative embodiment, Ethernet network 560 is an internet network, similar to network 102 of FIG. 1. However, in an alternative embodiment, Ethernet network 560 can also be any type of network, including but not limited to a network established within a business entity.

In use, logical partition framework 500 provides a mechanism for identifying an individual link status for virtual Ethernet adapter 515, virtual Ethernet adapter 525, and physical Ethernet adapter 550. A link status is the state of communication between two components. In other words, the link status determines whether data packets can be transmitted to a particular component via a particular route. A link is the connection point between two components. Thus, in the illustrative embodiment, virtual Ethernet adapter 515 provides the link between partition 510 and hypervisor 530. Likewise, virtual Ethernet adapter 525 provides the link between partition 520 and hypervisor 530. Furthermore, physical Ethernet adapter 550 provides the link between Ethernet network 560 and logical partitions 510 and 520.

The illustrative embodiments provide three different types of link status: (1) link-up; (2) link-down; and (3) partial link-down. A link status is the operational status of a particular Ethernet adapter. In the illustrative embodiment, the link status is the state of operation for virtual Ethernet adapter 515, virtual Ethernet adapter 525, and physical Ethernet adapter 550. Each Ethernet adapter has an individual link status and, depending on the state of operation, can have a different link status.

In these examples, the link-up status indicates that the Ethernet adapter is operating correctly. In other words, the link-up status indicates that communications traveling through virtual Ethernet adapters 515 and 525 and physical Ethernet adapter 550 are working correctly. Therefore, in the illustrative embodiment, the link-up status in virtual Ethernet adapter 515 indicates that data can be transmitted between partition 510 and hypervisor 530. Likewise, the link-up status in virtual Ethernet adapter 525 indicates that data can be transmitted between partition 520 and hypervisor 530. Similarly, the link-up status in physical Ethernet adapter 550 can be transmitted between virtual bridge 545 and Ethernet network 560.

The link-down status indicates that the Ethernet adapter is not operating correctly, and a communication disruption exists within the Ethernet adapter that impedes communications through the affected Ethernet adapter. The communication disruption indicates that the link that connects the two components is interrupted, and data cannot be communicated to the two components via the link that is affected. A link-down status in virtual Ethernet adapters 515 and 525 indicates a problem with the software instructions used to facilitate communications between logical partition 510 and logical partition 520. In other words, the software instructions executed in virtual Ethernet adapter 515 or virtual Ethernet adapter 525 has an error and communications within virtual Ethernet adapter 515 or virtual Ethernet adapter 525 is disrupted. Furthermore, a link-down status, on the other hand, in physical Ethernet adapter 550 indicates a disruption in communications between physical Ethernet adapter 550 and logical partitions 510 and 520. A link-down status in physical Ethernet adapter 550 typically indicates a physical failure within physical Ethernet adapter 550, such as a hardware failure, a faulty switch, or an unplugged Ethernet cable.

In the illustrative embodiments, a link-down status in either virtual Ethernet adapter 515 or 525 indicates a complete failure in communication between logical partition 510 or 520, respectively, and host system 570. In other words, a link-down status in either virtual Ethernet adapter 515 or 525 indicates an operational failure in both virtual Ethernet adapters 515 or 525 and indicates that physical Ethernet adapter 550 is not operating correctly. Thus, a link-down status in virtual Ethernet adapter 515 indicates that communications between partition 510 and host system 570 are disrupted. Likewise, a link-down status in virtual Ethernet adapter 525 indicates that communications between partition 520 and host system 570 are disrupted.

On the other hand, a partial link-down status indicates a failure in physical Ethernet adapter 550 but not in virtual Ethernet adapter 515 or virtual Ethernet adapter 525. Thus, a partial link failure status allows for communications between logical partitions 510 and 520 to continue even though communications between physical Ethernet adapter 550 and host system 570 are disrupted. As a result, in a partial link-down status, logical partitions 510 and 520 can attempt to recover communications with host system 570, while communications between logical partition 510 and 520 continue unhindered. In one embodiment, the operating system for the logical partition, either logical partition 510 or 520, in which communications is affected can initiate alternative protocols to recover communication with host system 570. One example alternative is to initiate an internet protocol takeover procedure, which includes the process of identifying another internet protocol address or node to replace the present communications channel. Another example is to establish another physical Ethernet adapter connection via a different virtual bridge.

Thus, in use, in the illustrative embodiment, hypervisor 530 receives a signal that a loss of communication within at least one link in logical partition framework 500 has occurred. The loss of communication is a failure to receive or transmit a data packet. Hypervisor 530 then determines which link is down. If hypervisor 530 determines that communications within physical Ethernet adapter 550 are disrupted while communications within virtual Ethernet adapters 515 and 525 are not, then hypervisor 530 categorizes the link status within Virtual Ethernet adapters 515 and 525 as a partial link-down. Hypervisor 530 then notifies the operating system that physical Ethernet adapter 550 is down, so that the operating system can execute instructions to find an alternative communications path. If, however, hypervisor 530 determines that communications within either virtual Ethernet adapter 515 or virtual Ethernet adapter 525 are disrupted and communications within physical Ethernet adapter 550 are disrupted, then hypervisor 530 categorizes the link status within Virtual Ethernet adapters 515 and 525 as link-down.

The illustrative embodiments are not limited to the illustrated example. For example, logical partition framework 500 can include more or fewer partitions, host systems, or components. Additionally, virtual Ethernet adapters 515 and 525 can each map directly to a separate physical Ethernet adapter, similar to physical Ethernet adapter 550. Moreover, a number of virtual Ethernet adapters can exist within each partition 510 and 520. In addition, each virtual Ethernet adapter 515 and 525 may bridge to a different virtual bridge, similar to virtual bridge 545. Each virtual bridge can then bridge communications traffic for a number of virtual Ethernet adapters. Furthermore, the illustrative embodiments can be implemented in any logical partition firmware and does not need to be implemented in a hypervisor similar to hypervisor 530.

Figure 6:
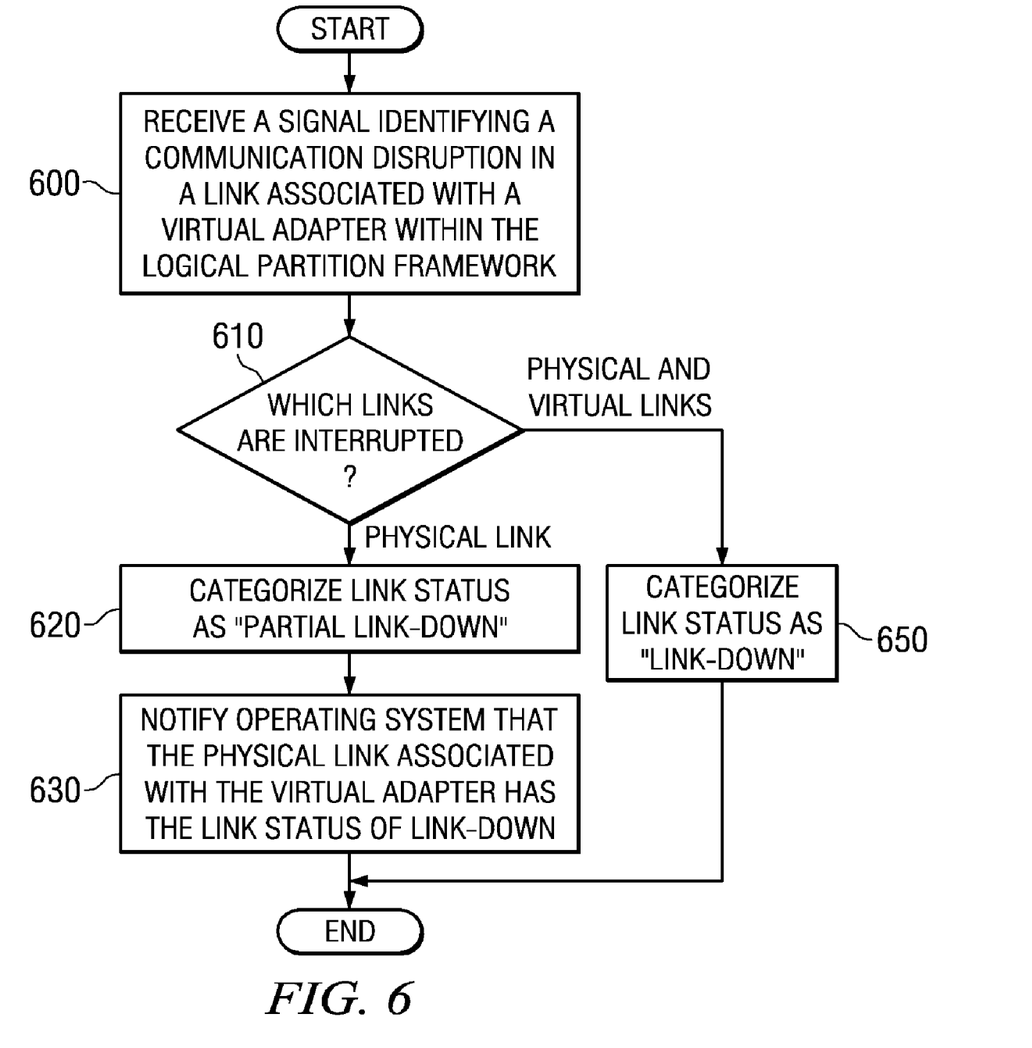
FIG. 6 is a flowchart depicting the process for identifying a link status, in accordance with an illustrative embodiment.

FIG. 6 is a flowchart depicting the process for identifying a link status, in accordance with an illustrative embodiment. The process can be executed in a partition management firmware, such as hypervisor 530 of FIG. 5. The following process is exemplary only and the order of the steps may be interchanged without deviating from the scope of the invention.

The process begins with a partition management firmware receiving a signal identifying a communication disruption in a link associated with a virtual adapter within the logical partition framework (step 600). The communication disruption indicates that the link that connects two components is interrupted, and data cannot be communicated to the two components via the link that is affected. The partition management firmware then identifies which links associated with the virtual adapter are affected by the communication disruption (step 610). If only the physical link is disrupted ("physical link" output of step 610), then the partition management firmware categorizes the link status for the virtual adapter as "partial link-down" (step 620). The partition management firmware then notifies an operating system that the physical link associated with the virtual adapter has the link status of link down (step 630). In response to the notification, the operating system then initiates instructions to identify an alternative route for the logical partition framework to communicate with an external network. The process terminates thereafter.

Returning to step 610, if both the physical and virtual link associated with the virtual adapter are disrupted ("physical and virtual Ethernet adapters" output), then the partition management firmware categorizes the link status as "link-down" (step 650). The process terminates thereafter.

Thus, the illustrative embodiments provide a computer-implemented method, an apparatus, and a computer-usable program product for identifying a link status for a virtual adapter in a logical partition framework. A partition management firmware receives a signal identifying a communication disruption in a link associated with the virtual adapter within the logical partition framework. The partition management firmware identifies which links associated with the virtual adapter are affected by the communication disruption. Two types of links can be disrupted in a logical partition framework: a physical link and a virtual link. The physical link facilitates communications between the logical partition framework and an external network. The physical link is an actual physical device, such as an Ethernet adapter. The virtual link facilitates communications between each logical partition in the logical partition framework. The virtual link is a software component or a set of software instructions that performs the same function as a physical Ethernet adapter.

In response to identifying that only a physical link associated with the virtual adapter is disrupted, the partition management firmware categorizes the link status for the virtual adapter as partial link-down. In response to identifying that both the physical link and a virtual link associated with the virtual adapter are disrupted, the partition management firmware categorizes the link status for the virtual adapter as link-down. Absent the receipt of a signal, the partition management firmware categorizes the link status for the virtual adapter as link-up.

In response to the link status being partial link-down, the partition management firmware notifies an operating system that the physical link associated with the virtual adapter has a link status of link down. In response to receiving the notification, the operating system initiates instructions to identify an alternative route for the logical partition framework to communicate with an external network. In one embodiment, the alternative route is to identify another physical link to communicate with an external network. In another embodiment, the alternative route is initiating an internet address takeover procedure. Additionally, in a partial link-down status, communications between each logical partition in the logical partition framework continues.

The illustrative embodiment provides for the identification of which link is disrupted. A partial link-down status allows for communications between logical partitions to continue as normal. Additionally, the partial link-down status provides a trigger for the data processing system to begin searching for an alternative route to transmit communications to an external data processing system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable medium or computer-readable medium providing program code for use by or in connection with a computer or any instruction execution system. For the purposes of this description, a computer-usable medium can be any tangible apparatus that can contain, store, communicate, propagate, or transport the program for use by or in connection with the instruction execution system, apparatus, or device.

The computer-usable medium can be an electronic, magnetic, optical, electromagnetic, infrared, or semiconductor system (or apparatus or device) or a propagation medium. Examples of a computer-readable medium include a semiconductor or solid state memory, a magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for identifying a link status for a virtual adapter in a logical partition framework, the method comprising:
   receiving, at a partition management firmware, a signal identifying a communication disruption in a link associated with the virtual adapter within the logical partition framework;
   identifying which links associated with the virtual adapter are affected by the communication disruption;
   responsive to identifying that only a physical link associated with the virtual adapter is disrupted, categorizing the link status for the virtual adapter as partial link-down; and
   responsive to identifying that both the physical link and a virtual link associated with the virtual adapter are disrupted, categorizing the link status for the virtual adapter as link-down.

2. The computer-implemented method of claim 1, further comprising:
   responsive to the link status being partial link-down, notifying an operating system that the physical link associated with the virtual adapter has the link status of link down, and wherein the operating system identifies an alternative route for the logical partition framework to communicate with an external network in response to a notification; and
   continuing to facilitate communications between each logical partition in the logical partition framework.

3. The computer-implemented method of claim 2, wherein the alternative route comprises identifying another physical link to communicate with an external network.

4. The computer-implemented method of claim 2, wherein the alternative route comprises initiating an internet address takeover procedure.

5. The computer-implemented method of claim 1, wherein the virtual link facilitates communications between each logical partition in the logical partition framework.

6. The computer-implemented method of claim 1, wherein the physical link facilitates communications between the logical partition framework and an external network.

7. The computer-implemented method of claim 1, further comprising:
   responsive to not receiving the signal, categorizing the link status for the virtual adapter as link-up.

8. A data processing system comprising:
   at least one logical partition in a logical partition framework;
   a partition management firmware that receives a signal identifying a communication disruption in a link associated with a virtual adapter within the logical partition framework, and wherein the partition management firmware identifies which links associated with the virtual adapter are affected by the communication disruption;
   a physical adapter coupled to the logical partition framework, wherein the partition management firmware categorizes a link status for the virtual adapter as partial link-down in response to identifying that only communications within the physical adapter are disrupted; and the virtual adapter coupled to the at least one logical partition and the partition management firmware, wherein the partition management firmware categorizes the link status for the virtual adapter as link-down in response to identifying that the communications within both the physical adapter and the virtual adapter are disrupted.

9. The data processing system of claim 8, wherein the partition management notifies an operating system that the physical link associated with the virtual adapter has the link status of link down in response to the link status for the virtual adapter being partial link-down, and wherein the operating system identifies an alternative route for the logical partition framework to communicate with an external network in response to a notification.

10. The data processing system of claim 9, wherein the alternative route comprises identifying another physical adapter of another logical partition to communicate with an external network.

11. The data processing system of claim 9, wherein the alternative route comprises initiating an internet address takeover procedure.

12. The data processing system of claim 8, wherein the virtual adapter facilitates communications between each logical partition in the logical partition framework.

13. The data processing system of claim 8, wherein the physical adapter facilitates communications between the logical partition framework and an external network.

14. A computer program product comprising a non-transitory computer-readable medium including computer-usable program code for identifying a link status in a logical partition framework, the computer program product comprising:

computer-usable program code for receiving, at a partition management firmware, a signal identifying a communication disruption in a link associated with the virtual adapter within the logical partition framework;

computer-usable program code for identifying which links associated with the virtual adapter are affected by the communication disruption;

responsive to identifying that only a physical link associated with the virtual adapter is disrupted, computer-usable program code for categorizing the link status for the virtual adapter as partial link-down; and responsive to identifying that both the physical link and a virtual link associated with the virtual adapter are disrupted, computer-usable program code for categorizing the link status for the virtual adapter as link-down.

15. The computer program product of claim 14, further comprising:

responsive to the link status being partial link-down, computer-usable program code for notifying an operating system that the physical link associated with the virtual adapter has the link status of link down, and wherein the operating system identifies an alternative route for the logical partition framework to communicate with an external network in response to a notification; and computer-usable program code for continuing to facilitate communications between each logical partition in the logical partition framework.

16. The computer program product of claim 15, wherein the alternative route comprises identifying another physical link to communicate with an external network.

17. The computer program product of claim 15, wherein the alternative route comprises initiating an internet address takeover procedure.

18. The computer program product of claim 14, wherein the virtual link facilitates communications between each logical partition in the logical partition framework.

19. The computer program product of claim 14, wherein the physical link facilitates communications between the logical partition framework and an external network.

20. A data processing system comprising:

a means for receiving, at a partition management firmware, a signal identifying a communication disruption in a link associated with the virtual adapter within the logical partition framework;

a means for identifying which links associated with the virtual adapter are affected by the communication disruption;

a physical link associated with the virtual adapter;

responsive to identifying that only the physical link associated with the virtual adapter is disrupted, a means for categorizing the link status for the virtual adapter as partial link-down; and responsive to identifying that both the physical link and a virtual link associated with the virtual adapter are disrupted, a means for categorizing the link status for the virtual adapter as link-down.

* * * * *